April 28, 1953     J. J. GAQUINTO     2,636,535
VEHICLE WHEEL
Filed Sept. 12, 1951
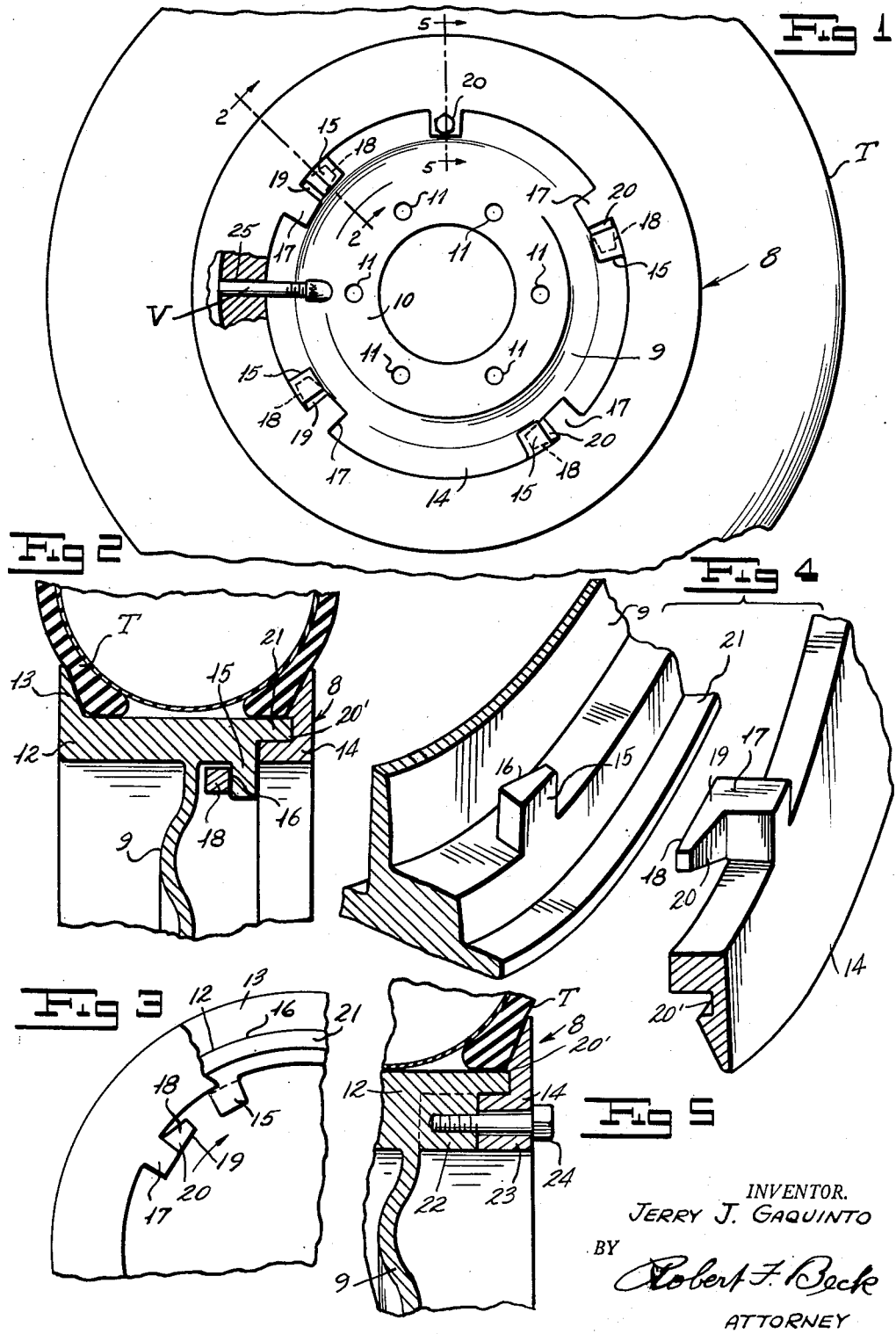
INVENTOR.
JERRY J. GAQUINTO
BY
Robert F. Beck
ATTORNEY Patented Apr. 28, 1953

2,636,535

UNITED STATES PATENT OFFICE 2,636,535

VEHICLE WHEEL

Jerry J. Gaquinto, Passaic, N. J.

Application September 12, 1951, Serial No. 246,291

3 Claims. (Cl. 152—412)

My invention relates to vehicle wheels and more particularly to means for mounting tires thereon.

One of the objects of my invention is to provide a wheel of the disc type wherein its peripheral rim is equipped with a detachable side flange to facilitate mounting of a tire on the rim.

An important object of my invention is to provide a wheel of the foregoing described character which is simple in construction, durable in use, efficient in operation and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a side elevation of a wheel constructed in accordance with my invention.

Figure 2 is a detail sectional view taken on the line 2—2 of Figure 1.

Figure 3 is a fragmentary side elevation of the rim with the detachable side flange disposed in released or unlocked position.

Figure 4 is a fragmentary disassembled perspective view of the wheel and detachable side flange.

Figure 5 is a detail sectional view taken on the line 5—5 of Figure 1.

In practicing my invention, as illustrated in the drawings, I provide a wheel 8 of the so-called "disc" type comprising a central dish-like section 9 having a hub portion 10 and a plurality of openings 11 for receiving bolts for securing the wheel to the axle assembly of a vehicle as is well known in the art. The section 9 is equipped with a peripheral rim 12 on which a rubber tire T is mounted, the rim comprising a ring or body portion provided with a pair of spaced side flanges 13 and 14, respectively, for maintaining the tire mounted on the rim in the usual manner. The flange 13 is fixed relative to and constitutes an integrant of the rim 12 while the flange 14 is detachable from the rim, as hereinafter made apparent, to facilitate mounting and removal of the tire on and from the rim.

The inner circumferential face of the rim, adjacent one side of the section 9, is provided with a plurality of inwardly and radially extending cuneiform lugs 15 each spaced from and having a rear face 16 disposed in confronting relation with the section 9 and in a plane angularly related to the axis of the wheel. The flange 14 is also provided, on its inner circumferential face, with a plurality of spaced inwardly and radially extending lugs 17 which engage and coact with the lugs 15 to secure the flange detachably connected to the rim.

Each of the lugs 17 is formed with a laterally extending off-set portion 18 overlying the inner circumferential face of the rim and which terminates adjacent the section 9 and in spaced relation therewith and the rim. The portion 18 is formed with a circumferentially extending cuneiform finger 19 having a front face 20 disposed in a plane angularly related to the axis of the wheel and in wedging engagement with the rear face 16 of the adjacent lug 15 whereby the lugs 15 and 17 coact to lock the flange 14 in fixed relation with the rim 12 when the fingers 19 so engage the lugs 15 as illustrated in Figures 1 and 2 of the drawings.

The inner radial face of the flange 14 is formed with a circumferential groove 20' in which is received a rib 21 formed on the adjacent confronting face of the rim. The rib 21 seats within the groove 20' to properly position the flange 14 about the rim and to serve as a guide for the flange when rotated into locked or unlocked positions relative to the rim. The inner circumferential faces of the rim 12 and the flange 14 are provided with projections 22 and 23 with the latter being disposed in front of the other when the flange 14 is in the locked position. The projections 22 and 23 are provided with openings with the opening in the projection 22 being threaded for receiving a bolt 24 which extends through the opening in the projection 23 whereby the projections are secured together in fixed relation to preclude rotation of the flange 14 relative to the rim 12. Adjacent the flange 14, the rim is slotted as at 25 for receiving the valve stem V carried by the tire to thereby facilitate lateral mounting and dismounting of the tire onto and from the rim.

In use, assuming the tire T is mounted on the rim 12 between the flanges 13 and 14 and the projections 22 and 23 are secured together by the bolt 24, the bolt 24 is unscrewed out of the projection 22 and the flange 14 then rotated counterclockwise to its unlocked position to dispose the fingers out of engagement with the lugs 15, as shown in Figure 3 of the drawings, whereupon the flange is detached from the rim thereby enabling the tire to be moved laterally onto or off of the rim as the case may be. A reverse of the foregoing operation serves to secure the flange 14 in its locked position on the rim.

Without further elaboration, the foregoing will so fully explain the invention that others, may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. A wheel having a rim adapted to have mounted thereon a tire, said rim comprising a ring having an inner circumferential face and formed at one side with a bead engaging flange and on the opposite side with an outwardly axially disposed rib extending about the radial face of said opposite side, a detachable bead engaging flange having an inner circumferential face in continuation of said first mentioned face and a rear radial face formed with a groove extending thereabout and receiving said rib, radially extending spaced lugs carried by said first mentioned circumferential face and each formed with a rear face disposed in a plane angularly related to the axis of said ring, radially extending spaced lugs carried by said second mentioned circumferential face and each formed with a rearwardly off-set portion provided with a circumferentially extending finger having a front face angularly related to the axis of said second mentioned flange, said front faces of said fingers being disposed in wedging engagement with the rear faces of said first mentioned lugs to secure said detachable bead engaging flange to said ring in fixed relation therewith whereby said flanges coact to maintain a tire mounted on said ring, and locking means effective for maintaining said detachable bead engaging flange in said relation against movement relative to said ring.

2. The structure defined in claim 1 wherein said locking means comprises a pair of radially extending projections fixed to said circumferential faces, respectively, with one of said projections being disposed over the other, and a bolt extending into said projections for securing said projections together in fixed relation whereby to maintain said relation, said bolt being removable from one of said projections to permit rotation of said detachable bead engaging flange relative to said ring to dispose said fingers out of engagement with said first mentioned lugs and thereby permit detachment of said detachable bead engaging flange from said ring.

3. A wheel having a rim adapted to have mounted thereon a tire, said rim comprising a ring having an inner circumferential face and formed at one side with a bead engaging flange and on the opposite side with an outwardly axially disposed rib extending about the radial face of said opposite side, a detachable bead engaging flange having an inner circumferential face in continuation of said first mentioned face and a rear radial face formed with a groove extending thereabout and receiving said rib, groups of spaced cuneiform lugs carried by said circumferential faces, respectively, with one group having wedging engagement with the other to secure said detachable bead engaging flange to said ring in fixed relation therewith whereby said flanges coact to maintain a tire mounted on said ring, and means effective for maintaining said detachable bead engaging flange in said relation against movement relative to said ring.

JERRY J. GAQUINTO.

References Cited in the file of this patent
UNITED STATES PATENTS

| Number | Name | Date |
| --- | --- | --- |
| 1,383,810 | Howell | July 5, 1921 |
| 1,591,819 | Hayward | July 6, 1926 |
| 1,936,745 | Areson | Nov. 28, 1933 |
| 2,559,288 | Ebert | July 3, 1951 |